*Pollock & Trickey,*
*Milking Stool.*
No. 89,684.    Patented May 4, 1869.
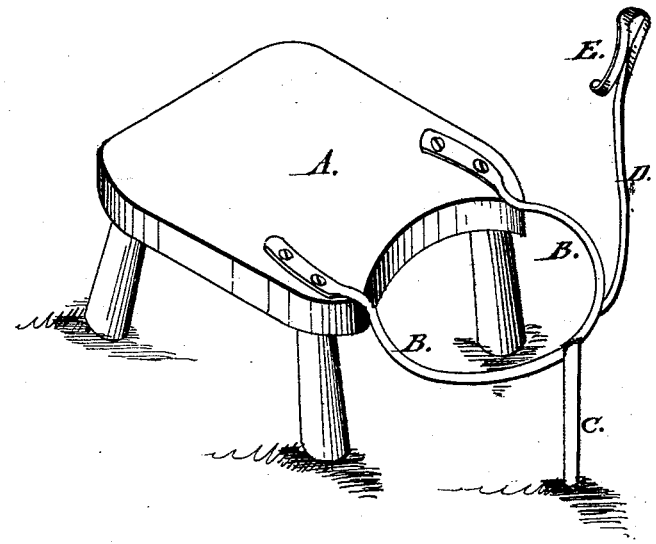
Witnesses:
A. W. Almqvist
Wm. A. Morgan
Inventors:
C. F. Pollock
N. Trickey
Per
Munn & Co.

United States Patent Office.

CHARLES F. POLLOCK AND NICHOLAS TRICKEY, OF THERESA, NEW YORK.

Letters Patent No. 89,684, dated May 4, 1869.

IMPROVEMENT IN MILKING-STOOLS.

The Schedule referred to in these Letters Patent and making part of the same.

*To all whom it may concern:*

Be it known that we, CHARLES F. POLLOCK and NICHOLAS TRICKEY, of Theresa, in the county of Jefferson, and State of New York, have invented a new and improved Milking-Stool; and we do hereby declare that the following is a full, clear, and exact description thereof, which will enable others skilled in the art to make and use the same, reference being had to the accompanying drawing, forming part of this specification.

The drawing is a perspective view of our invention.

The object of this invention is to provide a milking stool, which affords the means for holding the milk-pail, and also for holding the tail of the cow, so as to prevent the animal from annoying the person milking by switching the tail about.

It consists of an ordinary milking-stool, A, having one end provided with an iron hoop, B B, affixed to the stool, as shown, and provided with a leg, C, to assist in sustaining the weight of the filled pail.

The seat of the stool is curved to complete the circular rest afforded by the hoop, thus forming a seat for the milk-pail, which, as such are usually made slightly conical, will rest in the hoop, and be firmly held therein.

The standard D is also of iron, and is welded to the hoop near the leg C of the same.

The standard is bent off towards one side of the stool, as shown, and terminates in a hook or goose-neck, E, which is formed of steel, or with sufficient springy quality to hold the terminal tuft of hair of the animal's tail when the said tuft is forcibly inserted between the two parts composing the said hook or goose-neck.

Having thus described our invention,

We claim as new, and desire to secure by Letters Patent—

The combination of the device D E with the hoop B and stool A, as and for the purpose specified.

CHARLES F. POLLOCK.
NICHOLAS TRICKEY.

Witnesses:
FRANKLIN PARKER,
JASON C. MORROW.